United States Patent [19]

Derner et al.

[11] 4,124,257
[45] Nov. 7, 1978

[54] BEARING HOUSING

[75] Inventors: William J. Derner, Indianapolis; Ronald P. Spalding, Danville, both of Ind.

[73] Assignee: FMC Corporation, San Jose, Calif.

[21] Appl. No.: 823,578

[22] Filed: Aug. 11, 1977

[51] Int. Cl.$^2$ .................. F16C 23/08; F16C 33/00
[52] U.S. Cl. .................. 308/194; 308/29; 308/72; 403/71; 403/131; 403/143
[58] Field of Search .............. 308/27, 28, 29, 34, 308/30, 15, 72, 140, 194, 236, 245; 403/68, 69, 70, 71, 131, 143; 29/149.5 B

[56] References Cited

U.S. PATENT DOCUMENTS

| 1,606,747 | 11/1926 | Carter | 308/72 |
|---|---|---|---|
| 1,924,937 | 8/1933 | Leister | 308/236 |
| 1,934,527 | 11/1933 | Dodge | 308/194 |
| 2,549,154 | 4/1951 | Amos | 308/178 |
| 2,676,853 | 4/1954 | Shafer | 308/194 |
| 2,695,202 | 11/1954 | Holbrook et al. | 308/194 |
| 2,835,519 | 5/1958 | Spicacci et al. | 308/236 |
| 2,916,336 | 12/1959 | Andreini | 308/207 R |
| 3,506,317 | 4/1970 | de Angeli | 308/236 |

FOREIGN PATENT DOCUMENTS

| 510,748 | 3/1955 | Canada | 308/30 |
|---|---|---|---|
| 244,387 | 6/1906 | Fed. Rep. of Germany | 308/72 |
| 1,263,103 | 4/1961 | France | 403/143 |

Primary Examiner—Trygve M. Blix
Assistant Examiner—Charles E. Frankfort
Attorney, Agent, or Firm—J. W. Edwards; J. F. Verhoeven

[57] ABSTRACT

A housing is provided for mounting a bearing adjacent a wall to support a rotatable shaft that projects perpendicularly through the wall. The housing has a thin-stock stamping that forms on end cap having an axially extending hub and a mounting flange projecting radially outward at one end of the hub. An axial bore is provided within the end cup for receiving a first longitudinal portion of a bearing. A thick plate has an opening therein for receiving a second longitudinal portion of the bearing that projects axially outward from the hub end adjacent the mounting flange. One side of the plate is mounted flush with the wall, and an opposite side of the plate is mounted flush with the mounting flange of the thin-stock stamping. The plate has a surface adjacent the bearing opening that radially supports the second longitudinal portion of the bearing. This plate extends radially outward from the bearing opening. Both the mounting flange and the plate have openings therein for receiving bolts that fasten the housing to the wall. In a preferred embodiment, the plate has a thickness that is more than double the thickness of the thin-stock stamping and about one-third the axial length of the hub.

10 Claims, 2 Drawing Figures

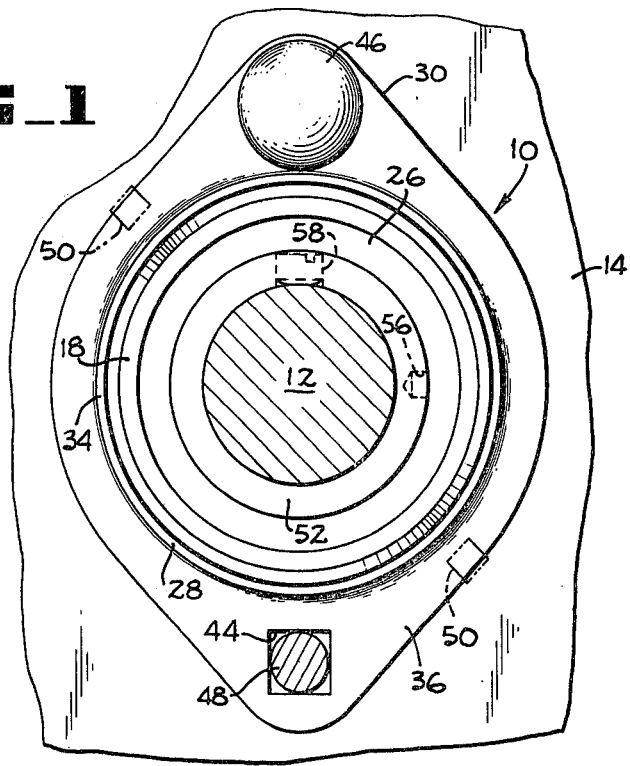
FIG_1
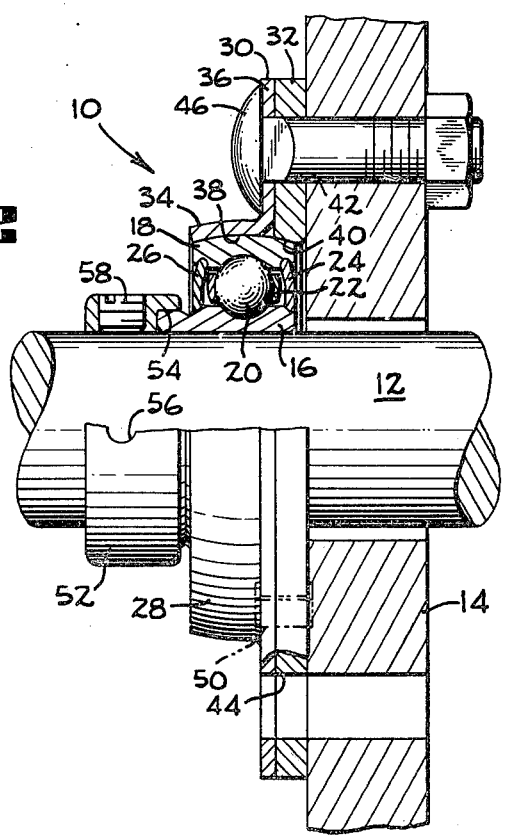
FIG_2

BEARING HOUSING

BACKGROUND OF THE INVENTION

1. Field of the Invention

This invention relates to bearings. More specifically, the invention is directed to rotary bearing supports of the shaft-hanger, wall-bracket type.

2. Description of the Prior Art

Bearing housings in the form of rotary bearing supports of the shaft-hanger, wall-bracket type have been made as castings and of stamped metal construction. Castings are more expensive than stamped metal, but such castings have greater strength for mounting a bearing flush with a wall. One-piece, thin-stock, stampings have been substituted for such castings, but the stampings are of limited strength due to forming limits of the sheet stock. Such stampings include an axially extending hub and a mounting flange projecting radially outward at one end of the hub. As the hub-length increases, it is more difficult to form the housing by a thin-stock stamping because the metal section between the hub and the radial flange is reduced in forming. To overcome this difficulty, two one-piece stampings have been used with the mounting flanges positioned back to back. Spacers are provided between the wall and the adjacent mounting flange face. Such construction is more costly and less reliable because of the added parts in the assembly that introduce additional variations. Alignment of this bolted construction is difficult. The bearing life can be limited by forcing operation of the bearing in a non-aligned orientation. Such two-piece stampings do not permit assembly of the bearing as a unit before installation. Two hands are required for locating the two-piece stampings, spacer, bearing assembly, and bolts. This requires additional assembly time.

Two-piece bearing housings are shown in U.S. Pat. No. 1,924,937 of Leister dated Aug. 29, 1933; U.S. Pat. No. 2,549,144 of Amos dated Apr. 17, 1951; U.S. Pat. No. 2,835,519 of Spicacci et al. dated May 20, 1958; U.S. Pat. No. 2,916,336 of Andreini dated Dec. 8, 1959; and U.S. Pat. No. 3506317 of DeAngeli dated Apr. 14, 1970. None of these patents shows a thin-stock stamping end cap in combination with a thick plate for mounting a bearing adjacent a wall to support a rotatable shaft that projects perpendicularly through the wall.

SUMMARY OF THE INVENTION

The purpose of the present invention is to provide a bearing housing that can be mounted in a location adjacent a wall for supporting a rotatable shaft that projects perpendicularly through the wall. The bearing housing should have adequate strength to properly hold an anti-friction bearing and the shaft in position. Such a bearing housing should be economical to manufacture and easy to install. The bearing housing should contain the anti-friction bearing as a unitary bearing assembly to facilitate installation.

A bearing housing is formed by a thin-stock stamping end cap and a thick plate. The stamping end cap has an axially extending hub and a mounting flange projecting radially outward at one end of the hub. The end cap has an axial bore for receiving a first longitudinal portion of the bearing. The thick plate has an opening therein for receiving a second longitudinal portion of the bearing that projects axially outward from the end cap adjacent the mounting flange. The plate has one side for mounting flush with a wall, and an opposite side of the plate is mounted flush with the mounting flange of the stamping. The plate has a surface, adjacent the bearing opening, that radially supports the second longitudinal portion of the bearing. This plate extends radially outward from the bearing opening. A plurality of openings are provided in both the plate and the mounting flange of the thin-stock stamping for receiving bolts to fasten the bearing housing to a wall.

In a preferred embodiment, the plate has a thickness that is more than double the thickness of the thin-stock stamping. The plate thickness is also about one-third the axial length of the stamping hub. The stamping and the plate have concave truncated spherical interval surfaces extending longitudinally of the hub bore and the plate opening. These surfaces mate with a convex truncated spherical outer surface of the anti-friction bearing. The mounting flange of the stamping is fastened to the thick plate by clips or adhesives. Thus, the bearing housing forms a unitary assembly retaining the anti-friction bearing axially therein prior to installation. Upon installation, the clips can be removed, since the bolts, that fasten the bearing housing to the wall, hold the stamping and the plate together.

BRIEF DESCRIPTION OF THE DRAWING

FIG. 1 is a front view of a bearing assembly embodying the present invention.

FIG. 2 is a side elevation with parts broken away of the bearing assembly shown in FIG. 1.

DESCRIPTION OF THE PREFERRED EMBODIMENT

With reference to FIG. 1, a bearing assembly 10 is provided for supporting a rotatable shaft 12 that projects perpendicularly through a wall 14. The bearing assembly includes an anti-friction bearing having an inner race ring 16 and an outer race ring 18. Ball bearings 20 are fitted in raceways between the inner and the outer race rings. These ball bearings are circumferentially spaced by a retainer ring 22. Seals 24 and 26 are provided on opposite sides of the ball bearings adjacent the axial ends of the outer race ring. The outer race ring has a convex truncated spherical outer surface extending axially thereof.

A bearing housing 28 includes a thin-stock stamping end cap 30 and a thick plate 32. The thin-stock stamping end cap forms both an axially extending hub 34 and a mounting flange 36 projecting radially outwardly at one end of the hub. The end cap has an axial bore 38 for receiving a first longitudinal portion of the bearing outer race ring 18. This first portion of the bearing corresponds to the length of the axial bore. The thick plate 32 has an opening 40 for receiving a second longitudinal portion of the bearing outer race ring that projects axially from the end cap adjacent the mounting flange. This second portion of the bearing has a length somewhat less than the thickness of the plate.

The plate 32 has a concave truncated spherical internal surface extending axially adjacent the opening 40 therein. The hub 34 has a concave truncated spherical internal surface adjacent the axial bore 38, and these internal surfaces of the hub and the plate supplement each other to form a continuous concave truncated spherical surface. The plate surface, adjacent the opening, provides radial support for the second longitudinal portion of the bearing outer race ring 18. The concave truncated spherical internal surfaces of the hub and the plate mate with the convex truncated spherical outer surface of the outer race ring to hold the ring in axial position with the housing 28.

The plate 32 has a thickness that is more than double the thickness of the thin-stock stamping. The plate thickness is also about one-third the axial length of the hub 34. These proportions enable both the plate and the hub to have sufficient strength for radially supporting the bearing outer race ring 18, and such proportions enable the hub to be formed economically by stamping. The plate has a pair of bolt openings 42 and 44 that extend axially parallel to the opening 40. In the mounting flange 36, similar bolt openings are provided in alignment with the bolt openings 42 and 44. These bolt openings receive bolts 46 and 48 for fastening the bearing housing 28 to the wall 14.

Preferably, the bearing assembly 10 is fastened together as a unit prior to installation to facilitate the installation. The anti-friction bearing is assembled within the outer race ring 18. Then the thin-stock stamping end cap 30 and the thick plate 32 are assembled about the outer race ring. The mounting flange 36 of the end cap can be bonded by adhesive to the plate, or clips 50, fitting about the outer edges of the flange and the plate, can be used to fasten the housing 28 together. After the bearing assembly 10 has been bolted to the wall 14, the clips 50 can be removed.

A conventional eccentric cam locking collar 52 is provided for fastening the inner race ring 16 in an axial position on the shaft 12. Such collars have an eccentric surface 54 on the underside of a lip overlapping a corresponding eccentric outside surface on the ring. When the collar is rotated relative to the ring, these eccentric surfaces wedge together to lock the ring in place on the shaft. An indentation 56 is provided in the collar for receiving a tool to turn the collar relative to the ring. A set screw 58 is provided in the collar for locking the collar in a desired radial position on the shaft. A conventional spring lock fastening device could be used in place of the conventional eccentric cam locking collar.

From the foregoing description, it will be seen that the disclosed bearing housing can be mounted in a location adjacent a wall for supporting a rotatable shaft that projects perpendicularly through the wall. The housing has adequate strength to properly hold an anti-friction bearing and shaft in position. The housing is economical to manufacture due to its stamped forming and plate boring construction. An anti-friction bearing is contained within the housing as a unitary bearing assembly, and this unitary structure facilitates installation.

Although the best mode contemplated for carrying out the present invention has been herein shown and described, it will be apparent that modification and variation may be made without departing from what is regarded to be the subject matter of the invention.

What is claimed is:

1. In a housing for mounting a bearing entirely on the outside of a wall to support a rotatable shaft that projects perpendicularly through the wall, said housing having a plurality of openings therein for receiving bolts that extend parallel to the shaft and fasten the housing to the wall, said housing having an end cap that can be formed by stamping from thin-stock, said end cap including an axially extending hub and a mounting flange projecting radially outward at one end of the hub, said end cap having an axial bore for receiving a first portion of said bearing, an improvement wherein said housing includes a flat thick plate having a bearing opening therein for receiving in wedging relationship a second portion of the bearing that projects beyond the end cap mounting flange, said plate extending radially outward adjacent the end cap mounting flange and thereby providing radial support for the bearing between the end cap and the wall, said plurality of openings for receiving bolts to fasten the housing to the wall being defined by a plurality of aligned openings in said end cap mounting flange and said plate.

2. The improved bearing housing described in claim 1 wherein said plate has a thickness that is more than double the thickness of the thin-stock stamping end cap.

3. The improved bearing housing described in claim 1 wherein said plate has a thickness that is about one-third the axial length of the end cap hub.

4. The improved bearing housing described in claim 3 wherein said plate has a thickness that is more than double the thickness of the end cap.

5. The improved bearing housing described in claim 1 wherein said plate adjacent the bearing opening has a concave truncated spherical internal surface extending axially of the bearing opening.

6. A bearing assembly for supporting a rotatable shaft that projects through a wall, said assembly comprising a bearing for receiving the rotatable shaft, and a housing for mounting the bearing entirely on the outside of the wall, said housing having a plurality of openings therein for receiving bolts that extend parallel to the shaft and fasten the housing to the wall, said housing having an end cap and a radial support plate, said end cap being formed above by stamping from thin-stock, said end cap having an axially extending hub and a mounting flange projecting radially outward at one end of the hub, said end cap having an axial bore for receiving a first portion of the bearing, said radial support plate being made of thicker material than the thin-stock of the end cap, said plate having an opening therein for receiving in wedging relationship a second portion of the bearing that projects axially from the end cap adjacent the mounting flange, said plate extending radially outward adjacent the end cap mounting flange from the bearing opening to beyond the bolt openings and thereby providing radial support for the bearing between the end cap and the wall, said plurality of openings for receiving bolts to fasten the housing to the wall being defined by a plurality of aligned openings in said end cap mounting flange and said plate.

7. A bearing assembly as described in claim 6 wherein said plate has a thickness that is more than double the thickness of the thin-stock end cap.

8. A bearing assembly as described in claim 6 wherein said plate has a thickness that is about one-third the axial length of the end cap hub.

9. A bearing assembly as described in claim 8 wherein said plate has a thickness that is more than double the thickness of the end cap.

10. The bearing assembly described in claim 6 wherein the end cap and the plate form a concave truncated spherical internal surface extending axially of the end cap bore and plate opening, and said bearing having a convex truncated outer surface extending axially thereof, said bearing outer surface mating with the internal surface of the end cap and the plate to hold the bearing longitudinally in place within the housing.

* * * * *

UNITED STATES PATENT OFFICE
CERTIFICATE OF CORRECTION

Patent No. 4,124,257      Dated November 14, 1978

Inventor(s) Derner, et al

It is certified that error appears in the above-identified patent and that said Letters Patent are hereby corrected as shown below:

In the Abstract, Line 7, change "cup" to --cap--

Column 4, line 51, after "thin-stock" insert --stamping---

*Signed and Sealed this*

*Nineteenth* Day of *February 1980*

[SEAL]

*Attest:*

SIDNEY A. DIAMOND

*Attesting Officer*      *Commissioner of Patents and Trademarks*